United States Patent
Savian et al.

(10) Patent No.: US 12,391,385 B1
(45) Date of Patent: Aug. 19, 2025

(54) BLENDED WING BODY AIRCRAFT WITH VARYING BAY WIDTHS

(71) Applicant: JetZero, Inc., Long Beach, CA (US)

(72) Inventors: Scott Savian, Los Angeles, CA (US); Ian Geoffrey Scoley, Huntington Beach, CA (US)

(73) Assignee: JetZero, Inc., Long Beach, CA (US)

( * ) Notice: Subject to any disclaimer, the term of this patent is extended or adjusted under 35 U.S.C. 154(b) by 53 days.

(21) Appl. No.: 18/829,947

(22) Filed: Sep. 10, 2024

(51) Int. Cl.
*B64D 11/06* (2006.01)
*B64D 11/02* (2006.01)
*B64D 11/04* (2006.01)

(52) U.S. Cl.
CPC .......... *B64D 11/0601* (2014.12); *B64D 11/02* (2013.01); *B64D 11/04* (2013.01); *B64D 11/0606* (2014.12)

(58) Field of Classification Search
CPC ..... B64D 11/02; B64D 11/04; B64D 11/0601; B64D 11/0606
See application file for complete search history.

(56) References Cited

U.S. PATENT DOCUMENTS

| | | | |
|---|---|---|---|
| 10,549,857 B2 | 2/2020 | Dowty et al. | |
| 10,894,604 B2 | 1/2021 | Heidtmann et al. | |
| 11,952,097 B1 * | 4/2024 | Page | B64C 1/1423 |
| 12,024,286 B1 * | 7/2024 | Page | B64C 39/10 |
| 2002/0145075 A1 * | 10/2002 | Page | B64U 10/20 |
| | | | 244/36 |
| 2004/0217234 A1 * | 11/2004 | Jones | A61M 21/02 |
| | | | 244/118.5 |
| 2014/0175215 A1 * | 6/2014 | Gallant | B64F 1/30 |
| | | | 244/36 |
| 2017/0183078 A1 * | 6/2017 | Cazals | B64C 1/1461 |
| 2018/0099752 A1 | 4/2018 | Johnson et al. | |
| 2018/0334254 A1 * | 11/2018 | Saint-Marc | B64D 11/003 |
| 2022/0001974 A1 * | 1/2022 | Page | B64C 25/04 |
| 2024/0253781 A1 * | 8/2024 | Rawdon | B64C 39/10 |

FOREIGN PATENT DOCUMENTS

EP 3543125 A1 9/2019

OTHER PUBLICATIONS

R.H. Liebeck; Design of the Blended Wing Body Subsonic Transport; Journal of Aircraft vol. 41, No. 1, Jan.-Feb. 2004.

\* cited by examiner

*Primary Examiner* — Tye William Abell
(74) *Attorney, Agent, or Firm* — Caldwell Intellectual Property Law

(57) ABSTRACT

A blended wing body aircraft, comprising a cabin, wherein the cabin comprises a first set of bays comprising a first plurality of seats arranged in a first seating configuration, wherein each bay of the first set of bays is associated with a first bay width, a second set of bays comprising a second plurality of seats arranged in a second seating configuration different than the first seating configuration, a central galley complex positioned in a front center location located between the first set of bays and the second set of bays, a central passage separating the first set of bays, the central galley complex, and the second set of bays, and at least a lavatory positioned outside the first set of bays and the second set of bays, along a perimeter of the cabin.

20 Claims, 4 Drawing Sheets

BLENDED WING BODY AIRCRAFT WITH VARYING BAY WIDTHS

FIELD OF THE INVENTION

The present invention generally relates to the field of aviation. In particular, the present invention is directed to a blended wing body aircraft with varying bay widths.

BACKGROUND

Aircraft cabin designs have traditionally followed a standard layout, with uniform bay widths and fixed positions for galleys and lavatories. This conventional arrangement often results in inefficiencies and limitations in terms of space utilization and passenger comfort. The placement of lavatories within passenger compartments can lead to discomfort for passengers seated nearby, and the fixed positions of galleys can restrict the flexibility of cabin reconfiguration.

SUMMARY OF THE DISCLOSURE

In an aspect, a blended wing body (BWB) aircraft, comprising a cabin, wherein the cabin comprises a first set of bays comprising a first plurality of seats arranged in a first seating configuration, wherein each bay of the first set of bays is associated with a first bay width, a second set of bays comprising a second plurality of seats arranged in a second seating configuration different than the first seating configuration, wherein each bay of the second set of bays is separated by a wall and at least an aisle, and the second set of bays is associated with varied bay widths different than the first bay width, a central galley complex positioned in a front center location located between the first set of bays and the second set of bays, wherein the central galley complex is configured to provide direct services to both the first plurality of seats and the second plurality of seats, a central passage separating the first set of bays, the central galley complex, and the second set of bays, wherein the central passage is connected to the at least an aisle, and at least a lavatory positioned outside the first set of bays and the second set of bays, along a perimeter of the cabin.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus for a blended wing body aircraft with varying bay widths. The a blended wing body aircraft with varying bay widths comprising a cabin, wherein the cabin comprises a first set of bays comprising a first plurality of seats arranged in a first seating configuration, wherein each bay of the first set of bays is associated with a first bay width, a second set of bays comprising a second plurality of seats arranged in a second seating configuration different than the first seating configuration, wherein each bay of the second set of bays is separated by a wall and at least an aisle, and the second set of bays is associated with varied bay widths different than the first bay width, a central galley complex positioned in a front center location located between the first set of bays and the second set of bays, wherein the central galley complex is configured to provide direct services to both the first plurality of seats and the second plurality of seats, a central passage separating the first set of bays, the central galley complex, and the second set of bays, wherein the central passage is connected to the at least an aisle, and at least a lavatory positioned outside the first set of bays and the second set of bays, along a perimeter of the cabin.

Figure 1:
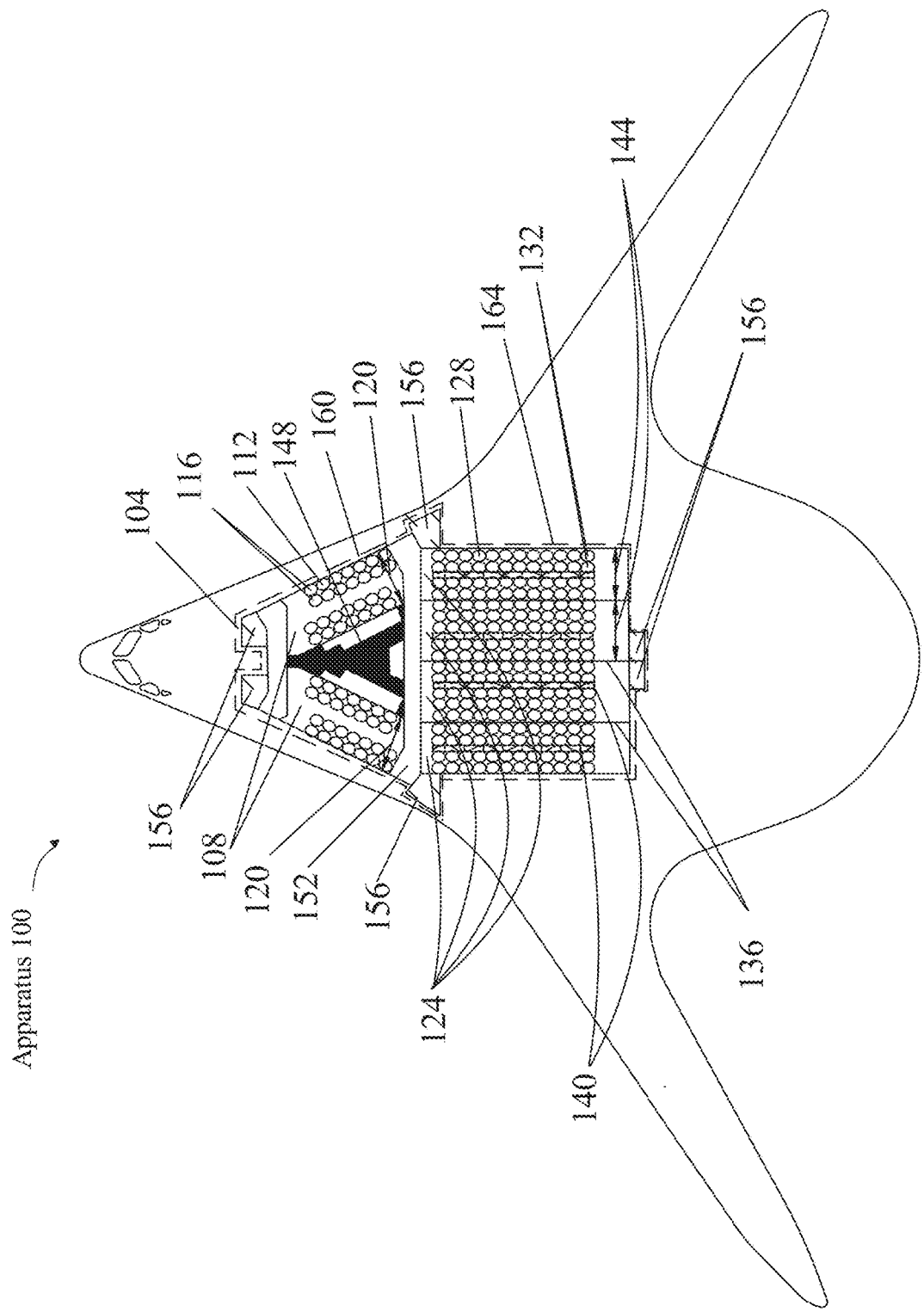
FIG. 1 is an exemplary illustration of a blended wing body aircraft with varying bay widths.

Referring now to FIG. 1, an exemplary embodiment of apparatus 100 a blended wing body aircraft with varying bay widths is illustrated. Apparatus 100 includes cabin 104, wherein the cabin 104 includes first set of bays which includes first plurality of seats arranged in first seating configuration 116, wherein each bay of the first set of bays 108 is associated with first bay width 120. As used in this disclosure, a "cabin" is the interior pressurized section of an aircraft. Without limitation, the cabin 104 may include the area where passengers are seated. Without limitation, the cabin 104 may be an area within the main body where passengers may be located and seated during a flight. The cabin 104 may include passenger seats, passenger tables, aisles, passenger bathrooms, and the like. Without limitation, the cabin 104 may include various compartments and amenities designed for passenger comfort and safety. In a non-limiting example, the cabin 104 may be constructed from lightweight composite materials such as carbon fiber-reinforced polymers and aluminum alloys, which may provide the necessary strength and rigidity to withstand the pressures and stresses encountered during flight. Continuing, these materials may contribute to reducing the overall weight of the aircraft and enhance fuel efficiency. In another non-limiting example, the cabin 104 may be manufactured using techniques such as automated fiber placement and 3D printing. Continuing, the aforementioned techniques may allow for precision build and customization in the design and assembly process. Continuing, these techniques may facilitate the integration of complex shapes and features, such as curved panels and modular compartments. Without limitation, the cabin 104 may be equipped with soundproofing materials and vibration dampening technologies to improve passenger comfort by minimizing noise and turbulence during flight. Without limitation, the dimensions of the cabin 104 may vary depending on the type of aircraft and its intended use. For instance, a commercial airliner may feature a wide-body cabin 104 with a width ranging from approximately 197 to 236 inches and a length of up to 2360 inches, allowing for multiple seating configurations and classes. In contrast, a smaller regional jet may have a narrow-body cabin 104 with a width of 118 to 157 inches and a length of 1180 inches. Continuing, the cabin 104 may include specialized sections such as crew rest areas, galleys, and lavatories, designed to optimize space utilization and operational efficiency.

Without limitation, the cabin 104 may include more than one bay wherein each bay may refer to a specific portion of the cabin 104. The bays may be separated by a structural element, wherein the structural element separates the bays into separate compartments. In some embodiments, a structural element separating the bays may include a wall 136. In some embodiments, a structural element separating the bays may include a series of pillars. In some embodiments, a structural element separating the bays may include a deep ceiling beam. In some embodiments, structural elements separating the bays may include windows wherein passenger in one bay may interact with passengers of another bay. In some embodiments, structural elements separating the bays may include doors allowing passengers to pass between the bays. In some embodiments, a structural element separating the bays may include a stiffener. In some embodiments, the cabin 104 may be divided into 2, 3, 4, 5, 6, 7, 8, 9, 10, or more bays.

As used in this disclosure, a "bay" is a distinct section within the cabin 104. In a non-limiting example. The bay may be designed to house a specific number of seats and amenities. In a non-limiting example, the bay may vary in size and configuration to accommodate different classes of service or passenger needs. Without limitation, the bay may be separated by walls or partitions to create a more private and comfortable environment. As used in this disclosure, a "wall" is a vertical structure within a cabin 104. Without limitation, the wall 136 may be designed to divide or enclose spaces.

Without limitation, the wall 136 may provide both physical separation and structural support. Without limitation, the walls within the cabin 104 may be designed to optimize space utilization, enhance passenger privacy, and contribute to the overall aesthetics and functionality of the interior. Without limitation, the wall 136 may be fixed or adjustable. In another non-limiting example, the wall 136 may completely partition the bays or may only provide partial division of the bays. In a non-limiting example, the wall 136 may include acoustic foam panels, strategically placed along the wall 136 and ceilings of the cabin 104 to absorb sound waves and reduce ambient noise. Without limitation, acoustic foam may be composed of lightweight, open-cell polyurethane material that effectively traps sound waves, minimizing echoes and reverberations within the cabin 104. Continuing, this material may be used in various sections of the aircraft, such as between seating areas or in partition wall 136, to enhance passenger comfort by creating a quieter environment. Without limitation, another example of sound-dampening material is mass-loaded vinyl (MLV). MLV is a dense, flexible material that may be applied to the cabin interior surfaces to block noise transmission. MLV may be integrated into the design of wall 136, floors, and or ceilings to provide a barrier against external noise, such as engine sounds or aerodynamic forces. Continuing, this material may be used in premium seating areas where passenger privacy and a serene atmosphere are prioritized. In another non-limiting example, composite laminates with embedded acoustic properties may be used in the construction of the walls and or the panels of the aircraft. Continuing, these laminates may consist of multiple layers of materials, such as fiberglass, carbon fiber, and a sound-dampening core, to work together to reduce noise levels. In a non-limiting example, the use of such materials may provide an effective sound barriers. Continuing the previous example, the cabin design may incorporate carpeting and upholstered surfaces made from sound-absorbing fibers. Without limitation, these materials may help to dampen noise from foot traffic and in-cabin activities, further enhancing the overall acoustic quality. Carpet tiles made from dense wool or nylon, for example, without limitation, may be laid throughout the cabin, providing both sound reduction and a comfortable walking surface for passengers.

As used in this disclosure, a "bay width" is the horizontal measurement across a bay within the cabin 104 of the aircraft. In a non-limiting example, the bay width may be determined by the spatial capacity available for seating arrangements and amenities. In a non-limiting example, the bay width may vary to accommodate different classes of service or to fulfill specific design goals, such as providing additional room for premium seating options or optimizing seating density in economy class. In a non-limiting example, bay widths may range from 39 inches in narrow sections to 79 inches or more in wider sections dedicated to luxury seating or multi-purpose areas. Without limitation, the bay width may impact the overall passenger experience and operational efficiency.

As used in this disclosure, a "first set of bays" is a designated section within the cabin 104 that is designed to house a specific number of seats and or amenities. In a non-limiting example, the first set of bays 108 may be tailored for a particular class of service and or passenger need. Without limitation, the first set of bays 108 may include features such as enhanced privacy, increased space, additional services, and the like. In another non-limiting example the first set of bays 108 may be larger or configured differently compared to other sections of the cabin 104, allowing for premium seating arrangements such as first-class or business-class configurations. In a non-limiting example, the first set of bays 108 may be located towards the front of the aircraft, offering amenities such as lie-flat seats, personal entertainment systems, exclusive access to onboard services like a dedicated restroom or galley, and the like.

With continued reference to FIG. 1, as used in this disclosure, a "seat" is a structure designed for passengers to occupy. In a non-limiting example, the seats may be constructed from lightweight materials, such as aluminum frames and foam cushions, covered with fire-resistant upholstery that complies with aviation safety standards. In a non-limiting example, seats may include various ergonomic features such as adjustable headrests, reclining backrests, armrests, integrated in-flight entertainment systems, and the like. Without limitation, the seats may be arranged in various configurations depending on the class of service and cabin layout, such as in rows, clusters, pods, and the like. In a non-limiting example, the seats may also incorporate power outlets, USB ports, connectivity for personal devices, and the like. Without limitation, the first plurality of seats 112 may offer additional amenities such as lie-flat capabilities, privacy partitions, personal storage, and the like. In another non-limiting example, the second plurality of seats 128 may include economy style seats which may be optimized for space efficiency and accessibility.

As used in this disclosure, a "first seating configuration" is an arrangement or position of seating elements, such as chairs, benches, or other seating structures. Without limitation, the first seating configuration 116 may include a layout where seats are arranged in a 1-2-1 configuration across the cabin 104. Without limitation, the first seating configuration 116 may ensure that every passenger has direct aisle access. Continuing, the first seating configuration 116 may provide that each seat is able to lie-flat, with ample legroom and privacy partitions for added comfort. Without limitation, the first seating configuration 116 may include seat that are staggered or angled, allowing passengers to recline fully without infringing on others' space. Additionally and or alternatively, the first seating configuration 116 may offer personal storage compartments, individual entertainment systems, enhanced dining option, and the like.

With continued reference to FIG. 1, as used in this disclosure, a "first bay width" is the horizontal measurement across the first set of bays 108 within the cabin 104. Without limitation, the first bay width 120 may be designed to accommodate a specific seating arrangement or class of service. Without limitation, the first bay width 120 may be greater than other sections to provide additional space and comfort for passengers. In a non-limiting example, the first bay width 120 might be configured to support a 1-2-1 seating arrangement in business class, allowing each passenger direct aisle access and increased personal space. In a non-limiting example, the wider configuration may enable the inclusion of privacy partitions or extended legroom, contributing to a more luxurious in-flight experience.

With continued reference to FIG. 1, the wall 136 may be manufactured out of sound-dampening materials. Continuing, the walls 136 may be constructed from lightweight and durable materials such as honeycomb aluminum panels or composite laminates. Continuing, this may provide structural support while maintaining flexibility for reconfiguration. In a non-limiting example, the bay may be designed to allow for modular seating arrangements, enabling airlines to adjust the layout based on demand and preferences. Without limitation, the dimensions of the bay and the number of bays may vary. In a non-limiting example, the dimensions of the bay may vary depending on the class of service and aircraft type. For example, without limitation, a first-class bay may feature a wider width of 79 to 118 inches, allowing for fully reclining seats and additional amenities such as privacy screens and personal storage compartments. In contrast, an economy-class bay may have a narrower width of 39 to 59 inches, with seats arranged in rows of three or four to maximize capacity. Continuing, the bays may include shared amenities such as overhead storage bins and lighting systems, designed to optimize the passenger experience and operational efficiency.

With continued reference to FIG. 1, as used in this disclosure, "overhead storage bins" are compartments located above passenger seats in an aircraft cabin. Without limitation the overhead storage bins may be designed to store carry-on luggage and personal items. In a non-limiting example, the overhead storage bins may be constructed from lightweight, durable materials such as reinforced plastic or composite materials. Continuing, this may ensure they can safely contain luggage during turbulence and meet aviation safety standards. In another non-limiting example, the overhead storage bins may be equipped with secure latches to prevent items from shifting or falling out during flight. Without limitation, the overhead storage bins may feature gas struts or hydraulic hinges to facilitate easy opening and closing, enhancing passenger convenience and accessibility. Without limitation, the dimensions of overhead storage bins may vary to accommodate different aircraft configurations and passenger needs. In a non-limiting example, the overhead storage bins may be designed to maximize storage capacity while maintaining sufficient headroom in the cabin. For example, an overhead storage bin may be 12 to 15 inches high, 20 to 24 inches deep, and extend several feet along the length of the cabin, providing ample space for standard carry-on luggage. In a non-limiting example, overhead storage bins may include integrated features such as LED lighting to improve visibility and labeling systems to assist passengers in locating their designated storage area.

With continued reference to FIG. 1, as used in this disclosure, "lighting systems" are an integrated network of lights within an aircraft cabin designed to enhance visibility, safety, and passenger comfort. In a non-limiting example, the lighting systems may include various lighting elements such as ceiling lights, reading lights, mood lighting, and emergency path lighting. Continuing, the lighting systems may be designed to be energy-efficient, often utilizing LED technology, which provides long-lasting illumination and reduces power consumption. Without limitation, the lighting systems may be programmable to create different ambiance settings depending on the phase of flight, such as takeoff, cruising, or landing. For instance, without limitation, mood lighting may be used to simulate natural daylight during boarding and transition to softer hues during night flights, helping passengers adjust to time zone changes and reducing jet lag. In another non-limiting example, reading lights may be installed above individual seats. Continuing, the reading lights may allow passengers to read or work without disturbing others. In another non-limiting example, emergency lighting may be placed along aisles and exits to guide passengers in case of an evacuation, ensuring compliance with safety regulations. In another non-limiting example, the lighting systems may be controlled via a central management system that allows the crew to adjust lighting levels and settings throughout the cabin. This system may also enable passengers to customize their personal lighting preferences through seat controls or an in-flight entertainment interface, further enhancing the passenger experience and operational efficiency.

Still referring to FIG. 1, including at least a bay, wherein the cabin further includes second set of bays 124 including a second plurality of seats 128 arranged in a second seating configuration 132 different than the first seating configuration 116, wherein each bay of the second set of bays 124 is separated by a wall 136 and at least an aisle 140, and the second set of bays 124 is associated with varied bay widths 144 different than the first bay width 120. As used in this disclosure, a "second set of bays" is another distinct section within the aircraft cabin. In a non-limiting example, the second set of bays 124 may differ from the first set of bays 108 in terms of layout, seating capacity, or level of service offered. Without limitation, the second set of bays 124 may be designed to accommodate a different class of service, such as economy class, where the focus is on maximizing seating capacity while maintaining passenger comfort. In a non-limiting example, the second set of bays 124 may be configured with narrower seats and reduced seat pitch to optimize the number of passengers that can be accommodated. The second set of bays 124 may also include amenities like overhead storage bins and shared access to restrooms and galleys, tailored to the needs of budget-conscious travelers. Without limitation, the second plurality of seats 128 may refer to a seating configuration typically found in second class or economy class on an aircraft. Continuing, the second plurality of seats 128 may be arranged in a 3-3 or 2-4-2 configuration across the cabin 104. In a non-limiting example, the second plurality of seats 128 may provide seating for multiple passengers in rows. Without limitation, the second plurality of seats 128 may be narrower and have less legroom compared to the first plurality of seats 112. For example, the second plurality of seats 128 may have a standard recline feature but without the lie-flat capability. Continuing, the second plurality of seats 128 may include basic amenities such as adjustable headrests, tray tables, and in-flight entertainment screens. As used in this disclosure, a "second seating configuration" is an arrangement or positioning of seating elements, such as seats or benches, that differs from the first seating configuration 116. In a non-limiting example, the second seating configuration 132 may include a more compact and efficient layout, such as a 3-3 arrangement across the width of a cabin. Continuing, this may include three seats placed side by side in a row, separated by an aisle, and mirrored on the other side of the aisle. Without limitation, the second seating configuration 132 may provide an economy or coach-type seating arrangement. Without limitation, the second seating configuration 132 may be designed to maximize the number of passengers in a given space. For example, the second seating configuration 132 may include narrower seats and limited recline, as well as shared armrests and less personal space compared to the first seating configuration 116.

Without limitation, as used in this disclosure, a "varied bay width" is the horizontal measurement across the second set of bays 124 within the aircraft cabin. In a non-limiting example, the varied bay width may be designed to maximize seating capacity and accommodate a different class of service. Without limitation, the varied bay width may be narrower compared to the first set of bays 108. In a non-limiting example. The varied bay width may focus on efficiency and optimizing space utilization for a larger number of passengers. In a non-limiting example, the varied bay width may be designed to accommodate a 3-3 or 3-4-3 seating arrangement in economy class, where the emphasis is on maximizing the number of seats while maintaining essential passenger comfort. Continuing, the narrower width may allow airlines to efficiently use the cabin 104 space, catering to travelers seeking economical options. In another non-limiting example, the narrower second bay width may facilitate the inclusion of slimmer seats or reduced aisle widths, allowing for more rows of seats and maximizing revenue potential for the airline. Continuing the previous non-limiting example, the design of the second bay width could incorporate modular elements to adjust seating density based on flight demand.

With continued reference to FIG. 1, as used in this disclosure, an "aisle" is a designated passageway within the cabin that allows passengers and crew to move freely between seats and other sections of the cabin. In a non-limiting example, the at least an aisle 140 may provide access to seats, exits, amenities such as restrooms, galleys, and the like. Without limitation, the at least an aisle 140 may be designed to be wide enough to accommodate passengers walking side-by-side or with carry-on luggage. In a non-limiting example, the at least an aisle 140 may serve as emergency evacuation routes, requiring compliance with aviation safety standards for width and unobstructed pathways.

With continued reference to FIG. 1, the at least an aisle 140 may include an adjustable aisle width. As used in this disclosure, an "adjustable aisle width" is a dynamic feature within an aircraft cabin that allows the width of the aisle to be modified according to specific needs or conditions during the flight. Continuing, the adjustable aisle width may be designed to enhance passenger comfort, improve traffic flow, and or increase operational efficiency by adapting to various phases of flight and passenger demands. For example, without limitation, the adjustable aisle width may utilize a system of mechanical tracks and rails embedded in the cabin floor, allowing sections of the aisle to slide or rotate to increase width. In another non-limiting example, the adjustable aisle width may be bordered by telescopic walls that can extend or retract. Continuing, the telescopic walls may be designed to seamlessly integrate with the cabin aesthetic while providing the flexibility to widen the aisle as needed. In a non-limiting example, the telescopic walls may be useful during high-traffic periods, improving the boarding process and reducing congestion.

With continued reference to FIG. 1, the second plurality of seats 128 may be configured in a modular seating arrangement. As used in this disclosure, a "modular seating arrangement" is a flexible seating system within the cabin. In a non-limiting example, the modular seating arrangement may be easily reconfigured to accommodate varying passenger needs, classes of service, or flight requirements. In a non-limiting example, the modular seating arrangement may allow airlines to optimize cabin space and customize seating layouts to enhance passenger comfort and operational efficiency. Without limitation, modular seating arrangements may involve seats that can be adjusted, added, or removed, and or may include additional features such as movable partitions or convertible seat designs. In a non-limiting example, the modular seating arrangement for first-class passengers may include luxurious pods that provide privacy and comfort. Without limitation, the pods may be configured in a 1-2-1 layout, ensuring direct aisle access for each passenger. Continuing, without limitation, the modular seating arrangement may allow for the integration of fully reclining seats that transform into flat beds, along with amenities such as personal entertainment systems, storage compartments, and privacy screens. Without limitation, airlines may adjust the number of first-class pods based on demand, expanding or contracting the area as needed while maintaining a premium experience. Continuing the previous non-limiting example, a business class section may utilize a 2-2-2 or 1-2-1 configuration, featuring suites with lie-flat seats and adjustable dividers for added privacy. Without limitation, the modular seating arrangement may provide airlines with the ability to customize the layout and provide more space for passengers on longer flights. For instance, without limitation, the second plurality of seats 128 may be positioned to face either the aisle or window, depending on passenger preference. Continuing, the modular seating arrangement may enable airlines to convert some business class suites into premium economy seats if there is a higher demand for that class on specific routes. In another non-limiting example, an economy class section may employ a modular seating arrangement that allows for various configurations, such as 3-3, 3-4-3, or 2-4-2. The second plurality of seats 128 in this class may be easily reconfigured to create more legroom, add family seating areas, or include premium economy options with additional pitch. Without limitation, airlines may choose to install removable seats to create extra space for passengers with mobility needs or to accommodate additional cargo on certain flights. Without limitation, the flexibility of the modular system may ensure that the cabin layout can be tailored to specific passenger demographics and route requirements. Without limitation, the modular seating arrangement may include convertible family areas within the cabin. Continuing, these areas may feature seats that fold down or rearrange to create a larger play or sleep space for families traveling with young children. Continuing, airlines may implement a 2-3-2 or 2-4-2 configuration, where middle seats may be converted into a bassinet or a table for activities. Continuing, the modular seating arrangement may enhance the travel experience for families by providing them with a comfortable and adaptable space while maintaining the airline's ability to revert to standard seating arrangements when necessary. In another non-limiting example, a modular seating arrangement may allow for mixed-class configurations, enabling airlines to offer a combination of economy, premium economy, and business class seats in the same cabin. By using movable partitions and adjustable seating modules, airlines may tailor the number of seats in each class to match passenger demand and optimize revenue. For instance, without limitation, a section of the cabin may start as premium economy but may be transformed into business class for long-haul flights, providing lie-flat options and enhanced services. Continuing, this versatility may ensure that the cabin layout may be quickly adapted to changing market conditions and customer preferences.

With continued reference to FIG. 1, the second seating configuration 132 may include a 2×3 seating arrangement. As used in this disclosure, a "2×3 seating arrangement" is a specific configuration within the bay of a cabin, where two seats are aligned on one side of an aisle and three seats are aligned on the opposite side of the aisle. In a non-limiting example the 2×3 seating arrangement may be employed to optimize seating capacity while ensuring passenger comfort and accessibility. Without limitation, each seat in the 2×3 seating arrangement may have a width of approximately 17 to 18 inches, providing adequate personal space for passengers. Without limitation, the seat pitch may be 30 to 32 inches, allowing for sufficient legroom and comfort during flight. As used in this disclosure, a "seat pitch" is the distance from a point on one seat to the same point on the seat in front. In an embodiment, the aisle width in the 2×3 configuration may be 20 inches wide to allow for easy movement of passengers and crew, and or accommodate service carts. Without limitation, the bay width for accommodating both seat rows and the aisle may be to inches. In a non-limiting example, the 2×3 seating arrangement may provide passengers in the two-seat section with direct aisle access, minimizing the need for others to climb over seatmates.

With continued reference to FIG. 1, the first plurality of seats 112 are aligned parallel with a leading edge 160 of the blended wing body aircraft. In a non-limiting example, passenger bays on a blended wing body aircraft may be consistent with one or more aspects of the passenger bays on a blended wing body aircraft described in U.S. patent application Ser. No. 18/829,822, filed on Sep. 10, 2024, titled "PASSENGER BAYS ON A BLENDED WING BODY AIRCRAFT," which is incorporated by reference herein in its entirety. As used in this disclosure, a "leading edge" of the BWB aircraft is a boundary or perimeter within the aircraft's interior structure close to the nose of the aircraft. Without limitation, the leading edge 160 may refer to areas such as the walls 136, ceilings, floors, or sections adjacent to aisles and partitions. Without limitation, the design and alignment of features like seats, storage, and amenities in relation to the leading edge 160 may be used to optimize space and enhance passenger comfort. In a non-limiting example, the first plurality of seats 112 within the cabin may be aligned parallel to the leading edge 160 of the blended wing body aircraft to maximize the use of space and ensure a streamlined passenger flow. For instance, the first plurality of seats 112 may be positioned along the walls 136 of the leading edge 160 of the blended wing body aircraft, providing a clear path through the aisle. Continuing, this arrangement may maximize aisle width. Without limitation, the leading edge 160 of the blended wing body aircraft may be utilized for integrating storage solutions such as overhead bins or sidewall stowage. Continuing, the storage areas may be positioned along the leading edge 160 of the blended wing body aircraft to keep the central cabin space open and uncluttered. For example, the overhead bins aligned with the leading edge 160 of the blended wing body aircraft may be designed to follow the contour of the aircraft's fuselage, and optimize the available space for carry-on luggage while maintaining headroom for passengers seated below. In another non-limiting example, the aisle space within the cabin may be influenced by the alignment of the leading edge 160 of the blended wing body aircraft. For example, the aisles may run parallel to the leading edge 160 of the blended wing body aircraft to provide a direct and unobstructed path through the cabin, facilitating the movement of passengers and crew. Continuing, this layout may enhance operational efficiency during boarding and deplaning and improve service delivery during flights. Without limitation, the aircraft may include curved edges within the cabin, designed to align with the aerodynamic shape of the fuselage. Continuing, the curved edges may influence seating arrangements by allowing for staggered seating configurations that follow the contour of the aircraft.

With continued reference to FIG. 1, the second plurality of seats 128 may be aligned parallel with an edge 164 of the cabin 104. As used in this disclosure, an "edge" of the cabin 104 is a boundary or perimeter within the aircraft's interior structure. Without limitation, the edge 164 may refer to areas such as the walls 136, ceilings, floors, or sections adjacent to aisles and partitions. Without limitation, the design and alignment of features like seats, storage, and amenities in relation to the edge 164 may be used to optimize space and enhance passenger comfort. In a non-limiting example, the second plurality of seats 128 within the cabin 104 may be aligned parallel to the edge 164 of cabin to maximize the use of space and ensure a streamlined passenger flow. For instance, the second plurality of seats 128 may be positioned along the walls 136 of the edge 164 of the cabin, providing a clear path through the aisle. Continuing, this arrangement may maximize aisle width. Without limitation, the edge 164 of the cabin may be utilized for integrating storage solutions such as overhead bins or sidewall stowage. Continuing, the storage areas may be positioned along the edge 164 of the cabin to keep the central cabin space open and uncluttered. For example, the overhead bins aligned with the edge 164 of the cabin may be designed to follow the contour of the aircraft's fuselage, and optimize the available space for carry-on luggage while maintaining headroom for passengers seated below. In another non-limiting example, the aisle space within the cabin 104 may be influenced by the alignment of the edge 164 of the cabin. For example, the aisles may run parallel to the edge 164 of the cabin to provide a direct and unobstructed path through the cabin 104, facilitating the movement of passengers and crew. Continuing, this layout may enhance operational efficiency during boarding and deplaning and improve service delivery during flights.

With continued reference to FIG. 1, the first plurality of seats 112 may include at least a first category of seating and the second plurality of seats 128 may include at least a second category of seating. As used in this disclosure, a "first category of seating" is a classification of seats within the aircraft cabin that offers a higher level of comfort and service. Without limitation, the first category of seating may include features such as increased legroom, wider seats, and additional recline options. Without limitation, the first category of seating may be associated with premium classes, such as business class or first class, where passengers receive enhanced amenities and personalized service. In a non-limiting example, first category of seats may include one or more of lie-flat seats, personal suites, and privacy dividers. In another non-limiting example, first category of seats may include access to exclusive services such as priority boarding and premium meal options, and the like. As used in this disclosure, a "second category of seating" is another classification of seats. In a non-limiting example, the second category of seating may be designed to provide efficient and affordable travel options for passengers. Without limitation, the second category of seating may focus on maximizing space utilization and cost-effectiveness while ensuring basic comfort and safety standards. In another non-limiting example, the second category of seating may include economy class seats, which may be arranged to accommodate more passengers with standard amenities. In a non-limiting example, the second category of seating may feature seat with standard pitch and width, limited recline options, and or shared access to cabin amenities, such as entertainment systems and food services, catering to travelers looking for economical options without sacrificing essential comfort.

With continued reference to FIG. 1, the varied bay width may be narrower than the first bay width 120. In a non-limiting example, the varied bay width may accommodate a more compact seating arrangement or a reduced space allocation for storage or equipment. Continuing, the varied bay width may include a narrower width may be designed to optimize the use of available space within the aircraft allowing for greater flexibility in overall layout while ensuring that essential components or features are retained. Continuing, the reduction in bay width may contribute to a more streamlined or efficient design. Without limitation, the varied bay widths 144 may be configured to accommodate a higher seating density.

With continued reference to FIG. 1, a transition between the varied bay widths 144 may include adjustable partition walls configured to be repositioned according to demand. As used in this disclosure, a "transition" is to the change or shift between different sections or elements within an aircraft. In a non-limiting example, the transition between varied bay widths 144 may include adjustable partition walls that can be repositioned as needed. Continuing, the transition could facilitate flexibility in the aircraft cabin layout by allowing sections to be modified according to demand, such as adjusting the width of bays to accommodate different seating configurations or storage needs. Continuing, the use of adjustable partition walls allows for adaptability in the space, ensuring that the aircraft can optimize its layout based on varying requirements or conditions.

Still referring to FIG. 1, the cabin includes a central galley complex positioned in a front center location located between the first set of bays 108 and the second set of bays 124, wherein the central galley complex is configured to provide direct services to both the first plurality of seats 112 and the second plurality of seats 128. As used in this disclosure, a "central galley complex" is a designated area within the cabin. In a non-limiting example, the central galley complex 148 may be used to prepare, store, and serve food and beverages to the passengers. In another non-limiting example, the central galley complex 148 may be strategically located to allow efficient access to all passenger areas, enabling quick and convenient service. In a non-limiting example, the central galley complex 148 may be triangular in shape, as discussed in more detail below, to maximize the use of available space and enhance workflow for the crew. Without limitation, the central galley complex 148 may include equipment such as ovens, refrigerators, and storage compartments for meal trays, utensils, supplies, and the like. As used in this disclosure, a "private space" is an area within the central galley complex 148 that is designated for the exclusive use of crew members, providing a secluded and functional environment for them to perform their duties without interference. Without limitation, the private space may include features such as seating, storage lockers, communication equipment, and the like. Continuing, these features may help ensure that crew members have the resources and privacy needed to manage in-flight operations. In a non-limiting example, the private space may be enclosed or partially partitioned to maintain separation from passenger areas. As used in this disclosure, a "resource" is a crew member. In a non-limiting example, the resources may utilize the central galley complex 148 to provide services to passengers. Without limitation, the resources may be responsible for managing food and beverage service, coordinating with other crew members, and ensuring passenger safety and comfort. Without limitation, the resource may include flight attendants, chefs, and or other specialized personnel who are trained to operate the equipment within the central galley complex 148 and deliver a high standard of service. In a non-limiting example, resources may be responsible for restocking supplies and maintaining cleanliness in the galley area.

With continued reference to FIG. 1, the central galley complex 148 may be configured to be triangular in shape. In a non-limiting example, the central galley complex 148 may be positioned at the center of the aircraft, enabling direct service to all points of the cabin. Continuing, the central galley complex 148 location may allow the central galley complex 148 to act as a hub for the distribution of food and beverages, with one point of the triangle directed towards the main aisle for easy access. In a non-limiting example, the triangular shape may accommodate essential galley equipment such as ovens, refrigeration units, and beverage dispensers along its edges, ensuring that crew members can quickly and efficiently prepare and serve meals. Additionally and or alternatively, the central galley complex 148 may include a private space for crew members, providing a secluded area where they can perform duties without passenger interference. In a non-limiting example, the triangular configuration of the central galley complex 148 may optimize space, improve the service efficiency, and enhance the passenger experience within the cabin.

With continued reference to FIG. 1, the central galley complex 148 may include one or more storage compartments for at least a cabin provision. As used in this disclosure, a "storage compartment" is a designated area within an aircraft cabin used to store passenger belongings, crew supplies, and essential equipment. Continuing, the storage compartments may be strategically located throughout the cabin to maximize accessibility and convenience while maintaining efficient use of space. Without limitation, storage compartments may be integrated into various parts of the cabin, including overhead bins, under-seat spaces, and galley storage areas. Without limitation the storage compartments may be the same or substantially similar to the overhead storage compartments as described herein. As used in this disclosure, a "cabin provision" is supplies and resources stored within the cabin. In a non-limiting example, the cabin provisions may be used by the crew to provide services to passengers during the flight. Without limitation, the cabin provisions may include meals, beverages, snacks, utensils, linens, other items necessary for in-flight service and passenger comfort, and the like. Without limitation, cabin provisions may be stored in designated areas, such as the central galley complex 148 or storage compartments, ensuring they are easily accessible to the crew throughout the journey. In a non-limiting example, a cabin provision may include pre-packaged meals that are stored in the central galley complex 148 and served to passengers during meal service. In another non-limiting example, the cabin provisions may include linens and service utensils, which are utilized by the crew to enhance the dining experience. Without limitation, the cabin provisions may include emergency equipment and first aid supplies.

Still referring to FIG. 1, the cabin 104 includes a central passage 152 separating the first set of bays 108, the central galley complex, and the second set of bays 124, wherein the central passage 152 is connected to the at least an aisle 140. As used in this disclosure, a "central passage" is a pathway or opening that runs through the middle of an aircraft. Without limitation, the central passage 152 may be accessible to passengers, flight attendants, and crew members, and the like. In a non-limiting example, the central passage 152 may serve various functions, including allowing movement between seats, providing access to lavatories, facilitating food and beverage service, and the like. In another non-limiting example, in the event of an emergency, the central passage 152 may also serve as a primary evacuation route. Without limitation, the central passage 152 dimensions may vary based on the aircraft's size and configuration. For example, without limitation, in a narrow-body aircraft, the central passage 152 may be 18 to 20 inches wide, while in a wide-body aircraft, it may be 40 to 50 inches wide to accommodate dual aisles. Without limitation, the central passage 152 height may align with the cabin 104 height. For instance, the central passage 152 height may range from 6 to 8 feet to allow comfortable standing room. In another non-limiting example, the central passage 152 may be orientated longitudinally from the front to the rear of the aircraft, dividing the cabin 104 into left and right sections. In another non-limiting configuration, the central passage 152 may be oriented laterally from left to right of the aircraft. For instance, without limitation, the central passage 152 way may divide the first set of bays 108 from the second set of bays 124.

Still referring to FIG. 1, the cabin includes at least a lavatory 156 positioned outside the first set of bays 108 and the second set of bays 124, along a perimeter of the cabin 104. As used in this disclosure, a "lavatory" is a restroom facility located within the cabin. In a non-limiting example, the at least a lavatory 156 may include motion-sensor lighting and or touchless fixtures. As used in this disclosure, "motion sensor lighting" is an automated lighting system that activates or deactivates based on the detection of movement within a designated area. Continuing, the motion sensor lighting may utilize sensors, such as infrared or ultrasonic sensors, to detect motion and control the lighting accordingly. Without limitation, the motion sensor lighting may provide convenience and energy efficiency in the at least a lavatory 156. In a non-limiting example, the motion sensor lighting may be installed in the at least a lavatory 156 to automatically illuminate the lavatory 156 when a passenger enters and turn off the lights shortly after the space is vacated. Continuing, the motion sensor lighting may enhance the passenger experience by providing immediate lighting without the need for physical switches. Continuing, this may be beneficial in low-light conditions, where the at least a lavatory 156 does not have a window or when passengers have their hands full. Additionally and or alternatively, the motion sensor lighting may contribute to energy conservation by ensuring that lights are only on when necessary, reducing power consumption during flights. Without limitation, the sensors used in the motion sensor lighting may be discreetly integrated into the lavatory 156 design, ensuring that the system does not intrude on the cabin aesthetic or passenger privacy. Continuing, the motion sensor lighting may be applied in other cabin areas, such as, without limitation, the central galley complex 148 and or storage compartments, to improve operational efficiency and safety by ensuring adequate lighting is available whenever movement is detected.

With continued reference to FIG. 1, as used in this disclosure, "touchless fixtures" are plumbing or other devices designed to operate without physical contact. In a non-limiting example, the touchless fixtures may utilize sensors to detect user presence and activate device functionality. Continuing, the touchless fixtures may help minimize the risk of germ transmission by reducing the need for manual handling. In a non-limiting example, the touchless fixtures in the lavatory 156 may include faucets, soap dispensers, hand dryers, and the like, which activate automatically when a passenger places their hands near the sensor. For instance, without limitation, a touchless faucet may use infrared sensors to detect hand movements and initiate water flow, automatically stopping when hands are removed. Continuing, this design may enhance hygiene by eliminating the need for users to touch potentially contaminated surfaces, while also reducing water usage through automatic shut-off features. Continuing, touchless soap dispensers and hand dryers may be similarly configured to activate upon detecting proximity. Without limitation, the touchless fixtures may help reduce the spread of germs.

With continued reference to FIG. 1, in a non-limiting example, the cabin may include one or more lavatories. In a non-limiting example, the lavatory 156 may be designed to provide passengers with a private and sanitary space for personal hygiene needs during the flight. Continuing, the lavatory 156 may be equipped with essential fixtures such as a toilet, sink, and mirror, along with amenities like soap dispensers, paper towels, waste receptacles, and the like. Without limitation, lavatories may be constructed to meet strict aviation safety standards and are typically compact to maximize cabin space while ensuring functionality and accessibility for passengers. For example, without limitation, the lavatory 156 may be strategically positioned along the perimeter of the cabin to optimize space utilization and reduce congestion in high-traffic areas. Continuing, the lavatory 156 design may include features such as an automatic flushing system, touchless faucets, antimicrobial surfaces to enhance cleanliness and hygiene, and the like. Additionally and or alternatively, the lavatory 156 may incorporate accessibility features, such as grab bars and a fold-down changing table, to accommodate passengers with special needs and families traveling with young children. Without limitation, the at least a lavatory 156 may be configured to be accessed by the at least an aisle 140.

With continued reference to FIG. 1, the at least a lavatory 156 may be irregularly shaped to maximize the use of available space along the perimeter of the cabin, allowing for optimized spatial efficiency and improved passenger comfort. Continuing, the irregular shaped design may allow the lavatory 156 to fit into unconventional or underutilized areas within the cabin, such as the corners or curved sections of the fuselage, thereby optimizing spatial efficiency and enhancing passenger comfort. In a non-limiting example, the irregularly shaped lavatory 156 may have a triangular or trapezoidal footprint. Without limitation, the base width of the lavatory 156 may range from 30 to 36 inches to provide sufficient room for the toilet and sink while fitting into narrower sections of the cabin. Without limitation, the depth may vary from 36 to 48 inches, allowing for comfortable use of the facilities without encroaching on the aisle or passenger seating areas. Without limitation, the height may extend from the floor to the ceiling of the cabin 78 to 84 inches to provide full standing room for passengers. In a non-limiting example, the irregular shape may involve non-standard angles, curves, or tapering edges that conform to the aircraft's structural features, allowing the lavatory 156 to occupy spaces that would otherwise be inaccessible or wasted. Continuing, the lavatory 156 design may improve the overall cabin layout by freeing up room for additional seating or amenities.

With continued reference to FIG. 1, the at least a lavatory 156 may include a sliding door mechanism. As used in this disclosure, a "sliding door mechanism" is a door system designed to open and close by sliding along a track or guide. Without limitation, the sliding door mechanism may be advantageous in confined spaces. Without limitation, the sliding door mechanical may be configured to provide unobstructed pathways. In a non-limiting example, the sliding door mechanism may be constructed out of a lightweight, durable door panel mounted on a set of rollers or gliders that move along a horizontal track. Without limitation, the track may be positioned at the top and or the bottom of the door frame. In another non-limiting example, the sliding door mechanism design may allow the door to slide parallel to the lavatory 156 wall, eliminating the need for additional clearance space required by traditional hinged doors. Such a system may be particularly beneficial in narrow corridors or spaces with high foot traffic, as it minimizes obstruction and enhances accessibility. Without limitation, the sliding door mechanism may incorporate a soft-close feature, wherein the soft-close feature may ensure that the door closes gently and quietly. Continuing, the soft-close feature may be achieved using damping devices or cushioned end stops that gradually slow the door's movement as it approaches the closed position. Additionally and or alternatively, a latch or locking mechanism may be integrated into the door handle to provide privacy and security for occupants. In another non-limiting example, the sliding door mechanism may include automatic or semi-automatic operation, allowing the door to be opened or closed with minimal effort. Continuing, the sliding door mechanism may use a sensor or touch-activated panel to trigger the door's movement, further enhancing convenience and functionality.

Figure 2:
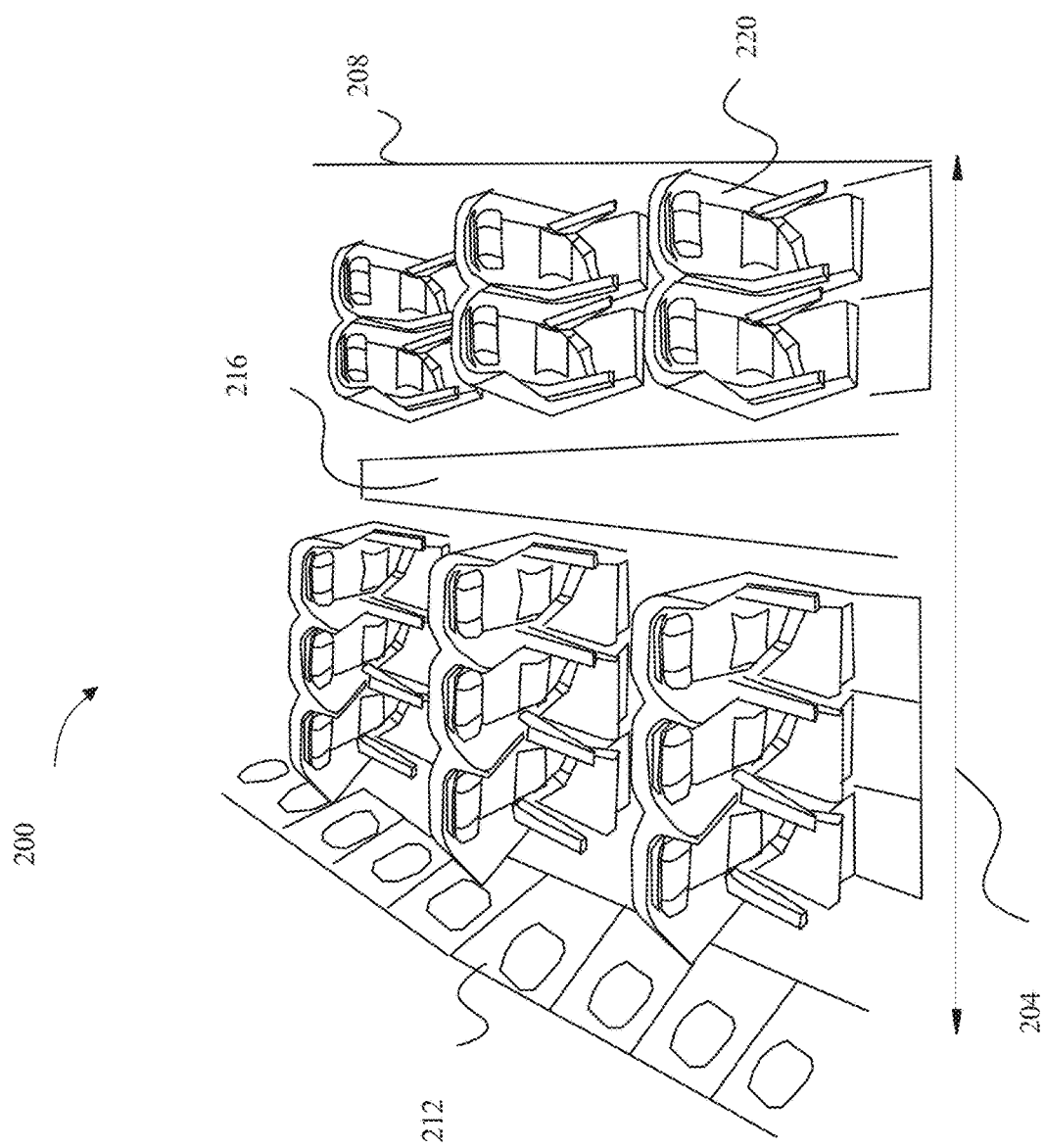
FIG. 2 is an exemplary illustration of a bay.

Referring now to FIG. 2, an exemplary illustration of a bay, 200, within a cabin of an aircraft. In an embodiment, the bay 200 may be depicted with a distinct dimension known as the bay width 204. Without limitation, the bay width 204 may vary depending on the use, category of seating and the like. In an embodiment, the bay 200 may be separated from other bays by a wall 208. In an embodiment the wall may include a partition wall, a structurally built in wall, and the like. In an embodiment, the bay 200, may include windows 212. In an embodiment, windows 212 may include laminated glass with an acoustic interlayer that reduces noise penetration from outside the aircraft. Continuing, the laminated glass may include bonding layers of glass with a specialized interlayer that absorbs sound vibrations, thus minimizing noise from engines and air turbulence. In an embodiment, the bay 200 may include one or more aisles 216. In an embodiment, the bay 200 may accommodate a plurality of seats 220. Without limitation, the plurality of seats 220 may be arranged to optimize space while ensuring passenger accessibility and comfort. In an embodiment, the bay 200 may include an adaptable configuration that may include various seating arrangements and service levels, emphasizing the flexibility and functionality required for modern aircraft cabin designs.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 3. Furthermore, there is no intention to be bound by any expressed or implied theory presented in this disclosure.

Figure 3:
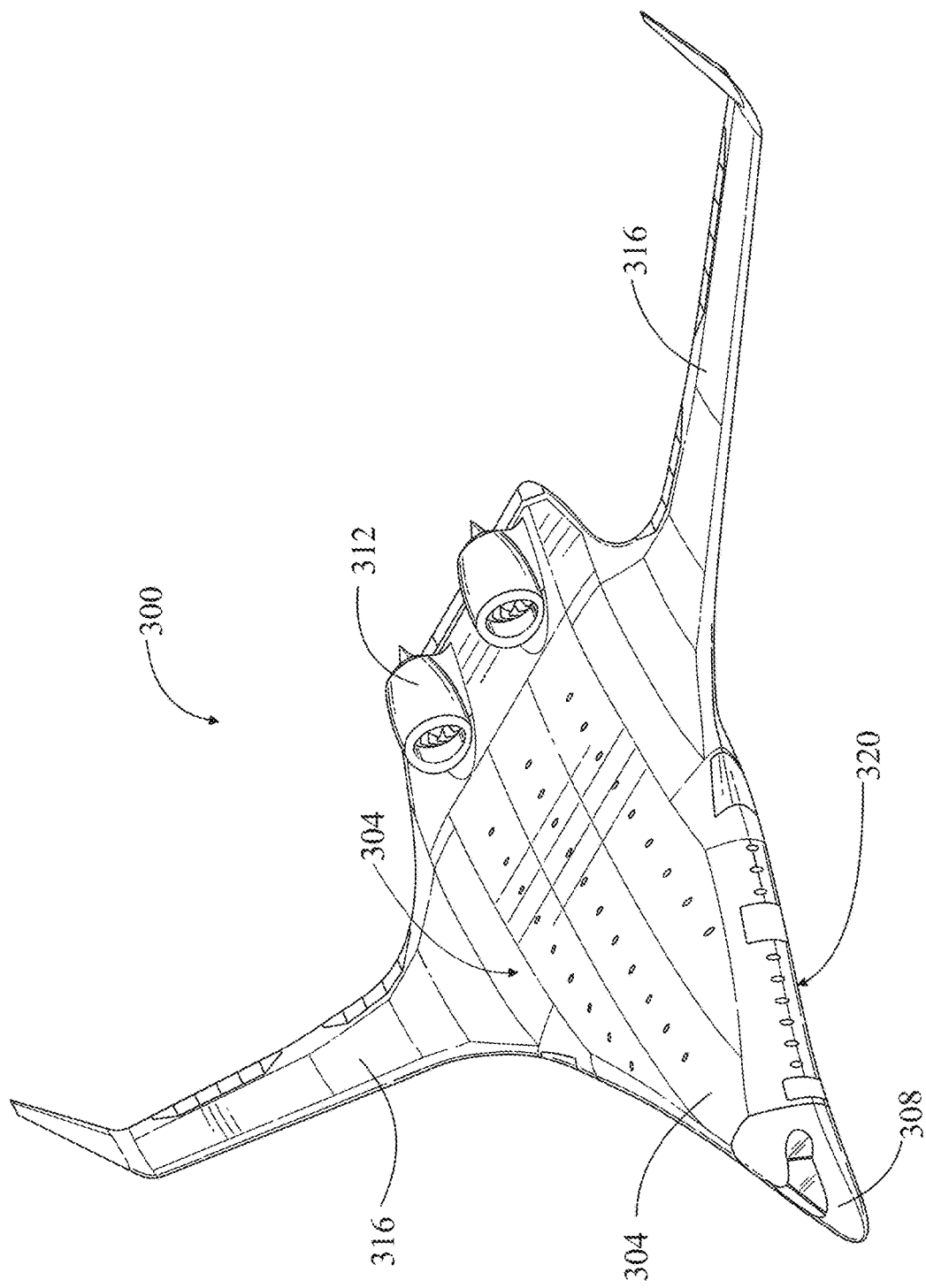
FIG. 3 is a schematic illustration of a top, front, and left perspective view of an exemplary blended wing body aircraft.

Referring now to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings 316 and a main body of the aircraft along a leading edge of the aircraft. For example, a BWB 304 aircraft may have distinct wing and body structures, which are smoothly blended together with no clear dividing line or boundary feature between wing and fuselage 320. This contrasts with a flying wing, which has no distinct fuselage 320, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings 316. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage 320, providing a large usable volume. In some embodiments, passengers seated within an interior of aircraft, real-time video at every seat can take place of window seats.

With continued reference to FIG. 3, BWB 304 of aircraft 300 may include a nose portion 308. A "nose portion," for the purposes of this disclosure, refers to any portion of aircraft 300 forward of the aircraft's fuselage 320. Nose portion 308 may comprise a cockpit (for manned aircraft), canopy, aerodynamic fairings, windshield, and/or any structural elements required to support mechanical loads. Nose portion 308 may also include pilot seats, control interfaces, gages, displays, inceptor sticks, throttle controls, collective pitch controls, and/or communication equipment, to name a few. Nose portion 308 may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion 308 may be configured to open in a plurality of orientations and directions.

With continued reference to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

With continued reference to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

With continued reference to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 3, BWB 304 may include at least a fuselage 320. A "fuselage," for the purposes of this disclosure, refers to a main body of an aircraft 300, or in other words, an entirety of the aircraft 300 except for nose, wings 316, empennage, nacelles, and control surfaces. In some cases, fuselage 320 may contain an aircraft's payload. At least a fuselage 320 may comprise structural components that physically support a shape and structure of an aircraft 300. Structural components may take a plurality of forms, alone or in combination with other types. Structural components vary depending on construction type of aircraft 300 and specifically, fuselage 320. A fuselage 320 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 3, in embodiments, at least a fuselage 320 may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage 320 orthogonal to a longitudinal (nose to tail) axis of aircraft 300. In some cases, a former forms a general shape of at least a fuselage 320. A former may include differing cross-sectional shapes at differing locations along a fuselage 320, as the former is a structural component that informs an overall shape of the fuselage 320. In embodiments, aircraft skin can be anchored to formers and strings such that an outer mold line of volume encapsulated by the formers and stringers comprises a same shape as aircraft 300 when installed. In other words, former(s) may form a fuselage's 320 ribs, and stringers may form interstitials between the ribs. A spiral orientation of stringers about formers may provide uniform robustness at any point on an aircraft fuselage 320 such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 3, according to some embodiments, a fuselage 320 can comprise monocoque construction. Monocoque construction can include a primary structure that forms a shell (or skin in an aircraft's case) and supports physical loads. Monocoque fuselages are fuselages 320 in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 3, according to some embodiments, a fuselage 320 may include a semi-monocoque construction. Semi-monocoque construction, as used in this disclosure, is used interchangeably with partially monocoque construction, discussed above. In semi-monocoque construction, a fuselage 320 may derive some structural support from stressed aircraft skin and some structural support from underlying frame structure made of structural components. Formers or station frames can be seen running transverse to a long axis of fuselage 320 with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage 320 and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in2) or Pascals (Pa). In semi-monocoque construction stressed skin bears part of aerodynamic loads and additionally imparts force on an underlying structure of stringers and formers.

With continued reference to FIG. 3, a fuselage 320 may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage 320 that requires additional bracing, specifically when disposed transverse to another structural element, like a post, that would benefit from support in that direction, opposing applied force. A beam may be disposed in a plurality of locations and orientations within a fuselage 320 as necessitated by operational and constructional requirements.

With continued reference to FIG. 3, aircraft 300 may include at least a flight component. A flight component may be consistent with any description of a flight component described in this disclosure, such as without limitation propulsor 312, control surfaces, rotors, paddle wheels, engines, propellers, wings 316, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component may include a propulsor 312, for example a rotor attached to an electric motor configured to produce shaft torque and in turn, create thrust. As used in this disclosure, an "electric motor" is an electrical machine that converts electric energy into mechanical work.

With continued reference to FIG. 3, for the purposes of this disclosure, "torque," is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor 312.

With continued reference to FIG. 3, at least a flight component may be one or more devices configured to affect aircraft's 300 attitude. "Attitude," for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum," for the purposes of this disclosure, refers to at least an element of data identifying an attitude of an aircraft 300.

With continued reference to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsor 312 working alone or in tandem consistent with the entirety of this disclosure. "Pitch," for the purposes of this disclosure refers to an aircraft's angle of attack, which is a difference between a plane including at least a portion of both wings greatly increasing wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 300. "Throttle," for the purposes of this disclosure, refers to an aircraft outputting an amount of thrust from a propulsor 312. In context of a pilot input, throttle may refer to a pilot's input to increase or decrease thrust produced by at least a propulsor 312. Flight components may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sine function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsor 312, flight components, or other elements of an electric aircraft. A torque datum may indicate the torque output of at least a flight component. At least a flight component may include any propulsor 312 as described herein. In embodiment, at least a flight component may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 3, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 3, at least a flight component may include wings 316, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings 316 comprise may include structures which include airfoils configured to create a pressure differential resulting in lift. Wings 316 are generally disposed on a left and right side of aircraft 300 symmetrically, at a point between nose and empennage. Wings 316 may comprise a plurality of geometries in planform view, swept swing, tapered, variable wing, triangular, oblong, elliptical, square, among others. Wings 316 may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings 316 may comprise controls surfaces configured to be commanded by a pilot and/or autopilot to change a wing's geometry and therefore its interaction with a fluid medium. Flight component may include control surfaces. Control surfaces may include without limitation flaps, ailerons, tabs, spoilers, and slats, among others. In some cases, control surfaces may be disposed on wings 316 in a plurality of locations and arrangements. In some cases, control surfaces may be disposed at leading and/or trailing edges of wings 316, and may be configured to deflect up, down, forward, aft, or any combination thereof.

In some cases, flight component may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 3, aircraft 300 may include an energy source. Energy source may include any device providing energy to at least a flight component, for example at least a propulsor 312. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor 312 during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion of blended wing body. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (° F.). Kerosene-based fuel has a much higher flash point than gasoline-based fuel, meaning that it requires significantly higher temperature to ignite.

With continued reference to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked," or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 3, aircraft 300 may include multiple flight component sub-systems, each of which may have a separate energy source. For instance, and without limitation, one or more flight components may have a dedicated energy source. Alternatively, or additionally, a plurality of energy sources may each provide power to two or more flight components, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor 312 or plurality of propulsor 312. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsor 312 in various configurations.

With continued reference to FIG. 3, aircraft 300 may include a flight component that includes at least a nacelle. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor 312, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

With continued reference to FIG. 3, a flight component may include a propulsor 312. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 3, in nonlimiting embodiments, at least a flight component may include an airbreathing engine such as a jet engine, turbojet engine, turboshaft engine, ramjet engine, scramjet engine, hybrid propulsion system, turbofan engine, or the like. At least a flight component may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 3, an aircraft 300 may include a flight controller. As used in this disclosure, a "flight controller" is a device that generates signals for controlling at least a flight component of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

With continued reference to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
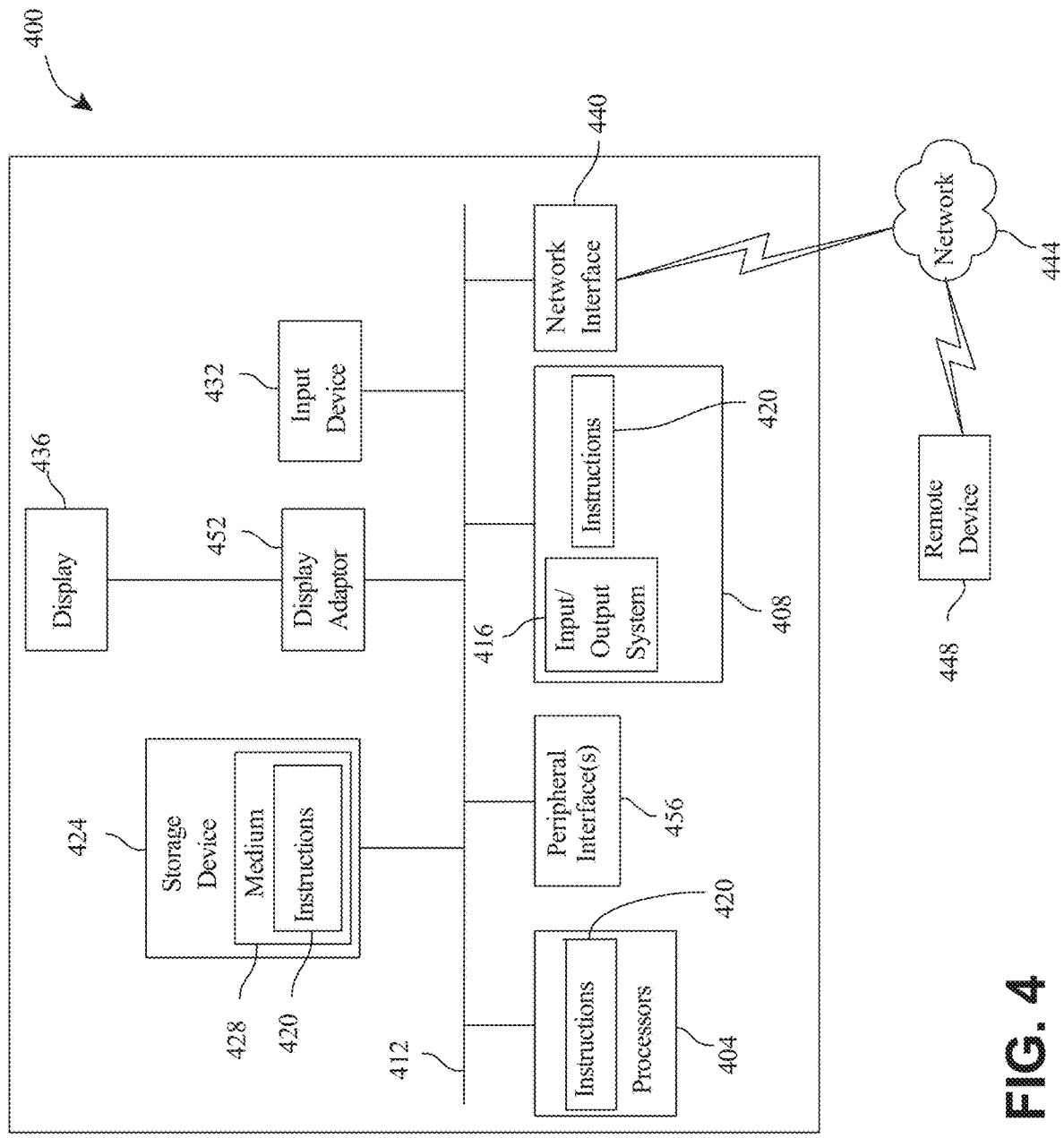
FIG. 4 is a block diagram of a computing system that can be used to implement any one or more of the methodologies disclosed herein and any one or more portions thereof.

FIG. 4 shows a diagrammatic representation of one embodiment of computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A blended wing body (BWB) aircraft, comprising:
   a blended wing body having a main body and wings with no clear demarcation between the wings and the main body along leading edges of the BWB aircraft;
   a cabin, wherein the cabin comprises:

a first set of bays comprising a first plurality of seats arranged in a first seating configuration, wherein each bay of the first set of bays is associated with a first bay width;

a second set of bays comprising a second plurality of seats arranged in a second seating configuration different than the first seating configuration, wherein:

each bay of the second set of bays is separated by a wall and at least an aisle; and the second set of bays is associated with varied bay widths different than the first bay width;

a central galley complex positioned in a front center location located between the first set of bays and the second set of bays, wherein the central galley complex is configured to provide direct services to both the first plurality of seats and the second plurality of seats;

a central passage separating the first set of bays, the central galley complex, and the second set of bays, wherein the central passage is connected to the at least an aisle; and at least a lavatory positioned outside the first set of bays and the second set of bays, along a perimeter of the cabin.

2. The blended wing body aircraft of claim 1, wherein the second plurality of seats in the at least a bay are configured in a modular seating arrangement.

3. The blended wing body aircraft of claim 1, wherein the first plurality of seats are aligned parallel with a leading edge of the blended wing body aircraft.

4. The blended wing body aircraft of claim 1, wherein the second plurality of seats are aligned parallel with an edge of the cabin.

5. The blended wing body aircraft of claim 1, wherein the varied bay widths are configured to be narrower than the first bay width.

6. The blended wing body aircraft of claim 1, wherein the first bay width is configured to accommodate wider seats with increased pitch.

7. The blended wing body aircraft of claim 1, wherein the varied bay widths are configured to accommodate a higher seating density.

8. The blended wing body aircraft of claim 1, wherein a transition between the varied bay widths comprises adjustable partition walls configured to be repositioned according to demand.

9. The blended wing body aircraft of claim 1, wherein the central galley complex is further configured to be triangular in shape.

10. The blended wing body aircraft of claim 1, wherein the central galley complex comprises one or more storage compartments for at least a cabin provision.

11. The blended wing body aircraft of claim 1, wherein the at least a lavatory is configured to be accessed by the at least an aisle.

12. The blended wing body aircraft of claim 1, wherein the at least a lavatory is irregularly shaped to maximize use of available space along the perimeter of the cabin, allowing for optimized spatial efficiency and improved passenger comfort.

13. The blended wing body aircraft of claim 1, wherein the at least a lavatory comprises a sliding door mechanism.

14. The blended wing body aircraft of claim 1, wherein the at least a lavatory comprises curved walls that conform to the perimeter of the cabin.

15. The blended wing body aircraft of claim 1, wherein the wall comprises sound-dampening materials.

16. The blended wing body aircraft of claim 1, wherein the second seating configuration comprises a 2×3 seating arrangement.

17. The blended wing body aircraft of claim 1, wherein the at least a lavatory comprises one or more of motion sensor lighting and touchless fixtures.

18. The blended wing body aircraft of claim 1, wherein the at least an aisle comprises an adjustable aisle width.

19. The blended wing body aircraft of claim 1, wherein the first plurality of seats comprise at least a first category of seating and the second plurality of seats comprise at least a second category of seating.

20. The blended wing body aircraft of claim 19, wherein the first category of seats comprise one or more of lie-flat seats, personal suites, and privacy dividers.

* * * * *